LE ROY W. SLY AND R. L. OLIVER
INSERTIBLE SAW TOOTH.
APPLICATION FILED APR. 18, 1917.
1,326,796.
Patented Dec. 30, 1919.
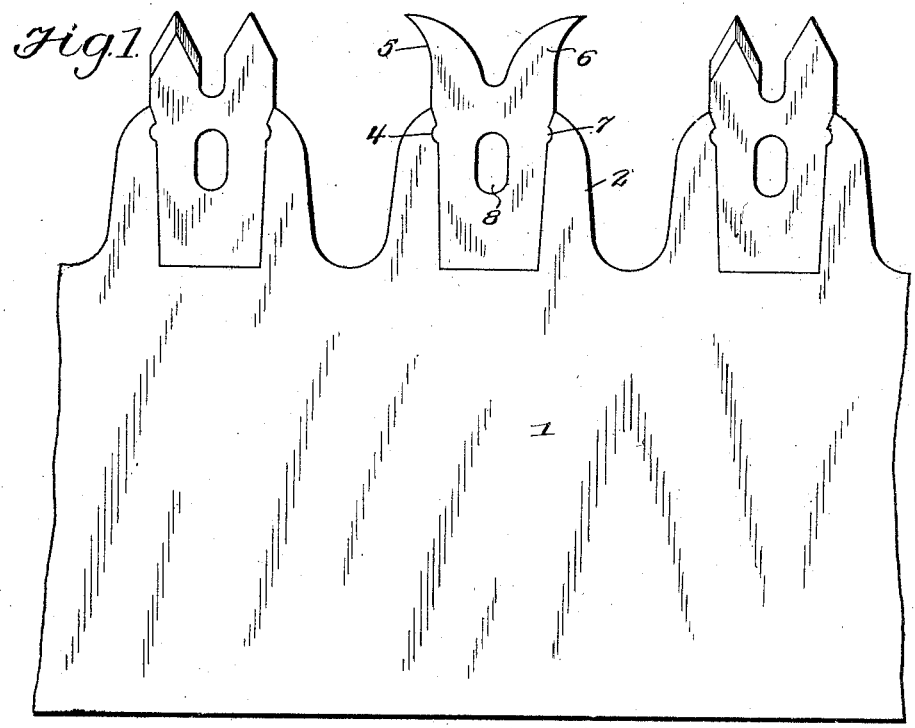
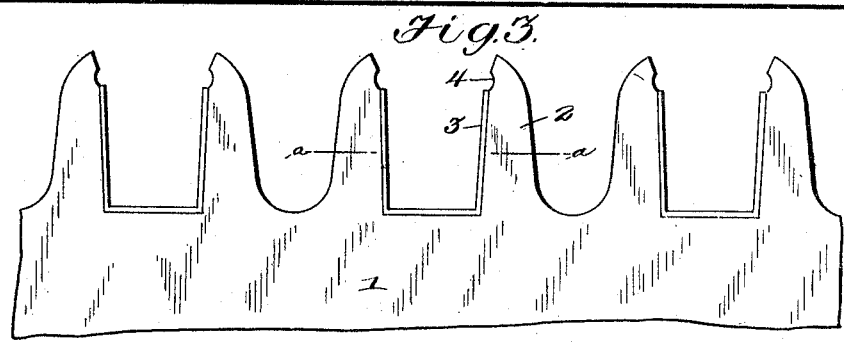
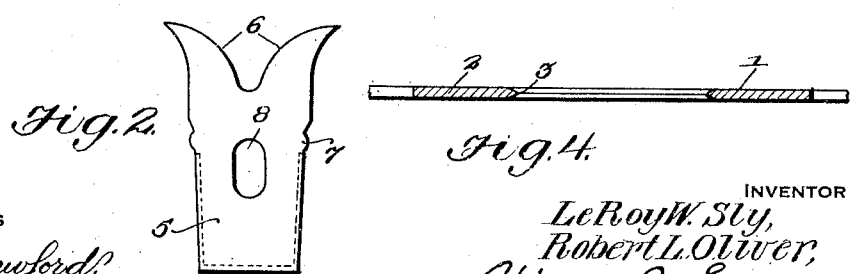
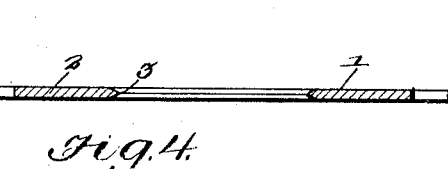
INVENTOR
LeRoy W. Sly,
Robert L. Oliver,
BY Victor J. Evans
ATTORNEY
WITNESSES

UNITED STATES PATENT OFFICE.

LE ROY W. SLY AND ROBERT L. OLIVER, OF DORRIS, CALIFORNIA.

INSERTIBLE SAW-TOOTH.

1,326,796.  Specification of Letters Patent.  Patented Dec. 30, 1919.

Application filed April 18, 1917. Serial No. 162,950.

*To all whom it may concern:*

Be it known that we, LE ROY W. SLY and ROBERT L. OLIVER, citizens of the United States, residing at Dorris, in the county of Siskiyou and State of California, have invented new and useful Improvements in Insertible Saw-Teeth, of which the following is a specification.

Our invention relates to insertible teeth for drag saws, which are reciprocated and cut in both directions, although not limited to this use alone. The primary object of our invention is to provide an insertible saw tooth which is well adapted to resist the various strains occasioned by the use thereof.

A further object of our invention is to provide an insertible saw tooth which may be easily and quickly inserted or taken out of the saw blade.

With these and other objects in view which will be hereinafter fully described and particularly pointed out in the claim, the invention consists in the novel construction and arrangement of parts illustrated in the accompanying drawings forming a part of this specification, in which:—

Figure 1 is a side elevation of a saw blade constructed in accordance with our invention, Fig. 2 is a side elevation of an insertible toothe made in accordance with our invention, Fig. 3 is a side elevation of the saw blade *per se*, Fig. 4 is a sectional detail enlarged section on the line *a—a* of Fig. 3.

Like characters of reference indicate like parts in the various views.

In the drawings 1 designates a saw blade. The tooth edge of the saw blade has a series of projections 2 extending laterally therefrom. These projections are paired off and the projections of each pair have oppositely disposed edges 3 formed thereon. Recesses 4 are formed in said oppositely disposed edges near the upper end thereof. The oppositely disposed edges which lie below said recesses are beveled from both sides as is also the base edge of the tooth-receiving opening. The edges of the projections which lie above the recess 4 are sharply divergent outwardly, and the portions of the saw blade which lie below said recesses are slightly divergent toward the upper end of the projections.

5 designates generally the insertible tooth, the cutting end 6 of which may be of any approved shape. The tooth is provided with lugs 7 which are adapted to engage corresponding recesses 4. The portions of the edges of the tooth which extend below the lugs 7 are grooved to correspond with the double beveled portion of the corresponding edges of the projections, the inner portion of the tooth being slightly divergent toward the upper end of the tooth to correspond therewith. The portions of the edges of the tooth which lie above the projection are sharply divergent outwardly to correspond with the respective portions of the edges of the projections. A hole 8 is formed in the tooth near the center thereof so that the tooth may be easily removed and inserted.

The lugs 7 are circular in form, and the tooth is moved longitudinally in a proper direction to insert or remove the same from the saw blade, the lugs 7 having a cam like action upon the projections 2 to spring the same apart sufficiently to allow said lugs 7 to be moved into and out of the recesses. The sharply divergent portions of the projections 2 lie above the recesses 4 and coact with the lugs 7 when the tooth is being inserted to spread the projections 2 so that the projections 2 may be easily spread to allow the tooth to be seated therebetween. The portions of the tooth which correspond with the sharply divergent portion of the upper portions of the projections are divergent correspondingly to prevent dirt or chips from working in between the tooth and the projections to spread the projections and thereby loosen the tooth from the saw blade. The portions of the tooth and the projections 2 which lie below the projections 7 and recesses 4 are slightly diverged outwardly so that the tooth may be easily inserted between the projections, and so that a high degree of accuracy may not be required in the making of the teeth. The oppositely beveled or V-shaped cross section of the base edge of the tooth-receiving opening serves to materially assist the similarly beveled side edges of the tooth opening in holding the tooth against displacement in the direction of its thickness; the said edges being disposed in correspondingly shaped grooves in the side edges and inner end of the tooth.

Having thus fully described our invention, we claim:—

A saw comprising a blade body having spaced resilient projections, extending laterally from one longitudinal edge thereof and forming an opening between them; the side edges and inner end edge of said opening being each of V-shape in cross-section, and the extreme outer portions of the side edges being square and diverged to the outer ends of the projections to form a flaring mouth in the square walls of which are rounded recesses, and a detachable tooth having an inwardly tapered inner portion and V-shaped grooves in its side edges and inner end receiving the beveled edges of the blade body, and also having square beveled shoulders bearing solidly against the outer square and diverged edges at the outer end or mouth of the opening and provided on said shoulders with rounded lugs disposed in said recesses.

In testimony whereof we affix our signatures.

LE ROY W. SLY.
ROBERT L. OLIVER.